United States Patent
Xu et al.

(10) Patent No.: US 12,299,789 B2
(45) Date of Patent: May 13, 2025

(54) METHOD FOR FUSING MAP DATA, AND ELECTRONIC DEVICE

(71) Applicant: BEIJING BAIDU NETCOM SCIENCE TECHNOLOGY CO., LTD., Beijing (CN)

(72) Inventors: Boyan Xu, Beijing (CN); Lele Jia, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 188 days.

(21) Appl. No.: 18/087,639

(22) Filed: Dec. 22, 2022

(65) Prior Publication Data

US 2023/0128282 A1 Apr. 27, 2023

(30) Foreign Application Priority Data

Jan. 19, 2022 (CN) .......................... 202210062631.0

(51) Int. Cl.
*G06T 11/60* (2006.01)

(52) U.S. Cl.
CPC .................................... *G06T 11/60* (2013.01)

(58) Field of Classification Search
None
See application file for complete search history.

(56) References Cited

U.S. PATENT DOCUMENTS

| | | | | |
|---|---|---|---|---|
| 11,043,026 B1* | 6/2021 | Fathi | ...................... | G06N 20/00 |
| 11,094,112 B2* | 8/2021 | Xu | ......................... | G06T 17/05 |
| 11,500,099 B2* | 11/2022 | Liang | ..................... | G06N 3/02 |
| 2013/0287290 A1* | 10/2013 | Owechko | ............... | G06T 7/344 |
| | | | | 382/154 |
| 2021/0063200 A1* | 3/2021 | Kroepfl | ............... | C03C 17/3644 |
| 2021/0404814 A1* | 12/2021 | Hess | ....................... | G01C 21/32 |
| 2021/0406559 A1* | 12/2021 | Efland | .................. | G06V 10/803 |
| 2022/0058844 A1* | 2/2022 | Chen | ...................... | G06F 3/147 |
| 2024/0094029 A1* | 3/2024 | Armstrong | ......... | G01C 21/3807 |

FOREIGN PATENT DOCUMENTS

| | | |
|---|---|---|
| CN | 110415347 A | 11/2019 |
| CN | 111721308 A | 9/2020 |

OTHER PUBLICATIONS

Office Action for Chinese Application No. 202210062631.0, dated Aug. 21, 2023, 20 pages.

* cited by examiner

*Primary Examiner* — Ryan M Gray
(74) *Attorney, Agent, or Firm* — Lippes Mathias LLP

(57) ABSTRACT

A method for fusing map data, includes: obtaining two-dimensional map data and three-dimensional map data to be fused; classifying the three-dimensional map data according to map data types, the map data types including line data, surface data, and traffic body data; performing elevation conversion for each type of three-dimensional map data according to an elevation conversion algorithm preset for each type of three-dimensional map data, to obtain a relative elevation of each type of three-dimensional map data; and fusing the two-dimensional map data and three-dimensional map data to be fused based on the relative elevation of each type of three-dimensional map data, to obtain fused data.

18 Claims, 6 Drawing Sheets

METHOD FOR FUSING MAP DATA, AND ELECTRONIC DEVICE

CROSS-REFERENCE TO RELATED APPLICATIONS

This application claims the benefit of priority to Chinese Patent Application No. 202210062631.0, filed on Jan. 19, 2022, the contents of which are incorporated herein by reference in their entireties for all purposes.

TECHNICAL FIELD

The present disclosure relates to the technical field of data processing, particularly to the technical field of map data processing.

BACKGROUND

In practical applications, especially in the process of map navigation, it is usually needed to fuse two-dimensional map data and three-dimensional map data for display.

SUMMARY

According to an aspect of the present disclosure, there is provided a method for fusing map data, including: obtaining two-dimensional map data and three-dimensional map data to be fused; classifying the three-dimensional map data according to map data types, the map data types including line data, surface data, and traffic body data; performing elevation conversion for each type of three-dimensional map data according to an elevation conversion algorithm preset for each type of three-dimensional map data, to obtain a relative elevation of each type of three-dimensional map data; and fusing the two-dimensional map data and three-dimensional map data to be fused based on the relative elevation of each type of three-dimensional map data, to obtain fused data.

According to yet another aspect of the present disclosure, there is provided an electronic device, including at least one processor and a memory communicatively coupled to the at least one processor; in which the at least one processor is configured to: obtain two-dimensional map data and three-dimensional map data to be fused; classify the three-dimensional map data according to map data types, the map data types including line data, surface data, and traffic body data; perform elevation conversion for each type of three-dimensional map data according to an elevation conversion algorithm preset for each type of three-dimensional map data, to obtain a relative elevation of each type of three-dimensional map data; and fuse the two-dimensional map data and three-dimensional map data to be fused based on the relative elevation of each type of three-dimensional map data, to obtain fused data.

According to yet another aspect of the present disclosure, there is provided a non-transitory computer-readable storage medium having computer instructions stored thereon. The computer instructions are configured to cause a computer to implement a method for fusing map data, including: obtaining two-dimensional map data and three-dimensional map data to be fused; classifying the three-dimensional map data according to map data types, the map data types including line data, surface data, and traffic body data; performing elevation conversion for each type of three-dimensional map data according to an elevation conversion algorithm preset for each type of three-dimensional map data, to obtain a relative elevation of each type of three-dimensional map data; and fusing the two-dimensional map data and three-dimensional map data to be fused based on the relative elevation of each type of three-dimensional map data, to obtain fused data.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the present disclosure, in which.

DETAILED DESCRIPTION

Figure 1:
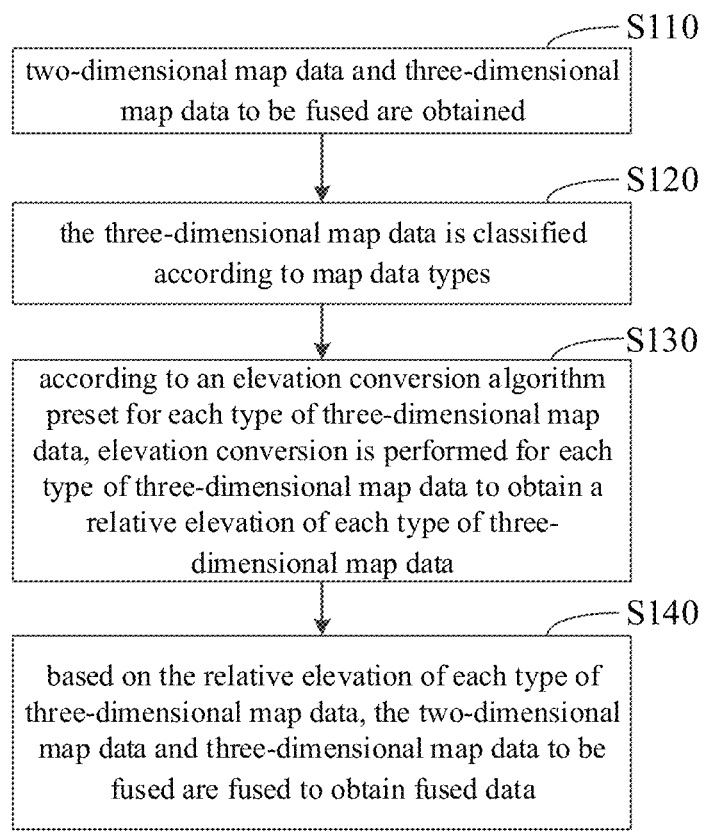
FIG. 1 is a flowchart of a first embodiment of a method for fusing map data provided according to the present disclosure.

Embodiments of the present disclosure are described below with reference to the accompanying drawings, including various details of the embodiments of the present disclosure to facilitate understanding, which shall be considered illustrative. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

In the field of transportation, lane level high-precision map data is an expression of real three-dimensional geospatial information of roads and surrounding facilities, so its location description is a description under a real three-dimensional space coordinate system. A location description of two-dimensional map road network data is a description under a two-dimensional space coordinate system (plane coordinate system).

It can be understood that a coordinate expression of the lane level high-precision map data is (x, y, z), in which z represents the elevation value. Due to the terrain, any point on the same road face may have different elevation values.

A coordinate expression of the two-dimensional map road network data is (x, y), it can be understood that there is no z-axis.

In practical applications, it usually needs to display the two-dimensional map data and three-dimensional map data on a same visualization page. Therefore, there is a need of a method for fusing the lane level high-precision map data and two-dimensional map road network data, to realize the presentation of the lane level high-precision map data on two-dimensional map road network data.

The existing method for fusing the two-dimensional and three-dimensional map data mainly uses a certain base height (such as the lowest elevation in all the lane level high-precision map data being used as the base point, or the location elevation of a central intersection) as the base, and subtracts the base value from all the lane level high-precision map coordinate data to relatively shift the elevation, realizing the alignment with the two-dimensional map road network data. For an area having obvious elevation problem, a manual modification is performed to optimize abnormal points.

However, as mentioned above, in the lane level high-precision map data, each point at the same road face may have a different elevation value due to terrain, if the elevations of all the points are converted based on a certain base point (the real elevation value minus the base value), there will still be some positions that cannot be not fully aligned with the ground, that is, a scene of floating in the air. In addition, the manual modification of abnormal points is with high labor cost and the abnormal points need to be solved individually, which is lack of the ability to replicate in a large scale.

Therefore, in order to solve the above problems, the present disclosure provides a method for fusing map data, an apparatus, an electronic device and a storage medium to realize the fusion and display of the two-dimensional map data and three-dimensional map data. The following describes the method for fusing map data provided by the present disclosure at first.

Referring to FIG. 1, which is a flowchart of a first embodiment of a method for fusing map data provided according to the present disclosure. The method may include the following steps.

At block S110, two-dimensional map data and three-dimensional map data to be fused are obtained.

In the embodiment of the present disclosure, the two-dimensional map data can be two-dimensional map road network data. The two-dimensional map road network data can include road network and other information. In the embodiment of the present disclosure, the three-dimensional map data can be lane level high-precision map data. As mentioned above, the lane level high-precision map data is an expression of real three-dimensional geospatial information of roads and surrounding facilities, and its location description is a description under a real three-dimensional space coordinate system.

In the embodiment of the present disclosure, a coordinate expression of the above three-dimensional map data can be (x, y, z), in which x, y can be longitude and latitude information, and z can be absolute elevation information. The absolute elevation is a distance from a ground point to the geoid along the vertical direction.

At block S120, the three-dimensional map data is classified according to map data types.

The real traffic scene usually includes road surface, green belt, lane lines, street lights, etc. Therefore, in the embodiment of the present disclosure, the map data types includes line data, surface data, and traffic body data.

The line data can be a line consisting of a continuous coordinate series. For example, a lane line, lane centerline, median lines, etc. The surface data can be a surface consisting of a continuous and closed coordinate series. For example, road surface, green belt surface and diversion area surface. The traffic body data can be a bounding box containing a centroid coordinate. Specifically, the above traffic body data can be bounding box data consisting of a centroid coordinate, length parameter, width parameter, height parameter, and angles. The traffic body can be, for example, lamp pole, sign, gantry, camera, etc.

Through classifying the three-dimensional map data by type, different elevation conversion algorithms can be used to perform an elevation conversion for different types of three-dimensional map data, which makes the elevation conversion more targeted and improves the accuracy of elevation conversion.

At block S130, according to an elevation conversion algorithm preset for each type of three-dimensional map data, elevation conversion is performed for each type of three-dimensional map data to obtain a relative elevation of each type of three-dimensional map data.

As mentioned above, in the embodiment of the present disclosure, the elevation of the above three-dimensional map data can be the absolute elevation of the road surface data, road lamp data or other data. Therefore, when fusing the two-dimensional map data and the three-dimensional map data, the absolute elevation of the three-dimensional map data can be converted to a relative elevation using the two-dimensional map data as a base surface, so as to align the three-dimensional map data with the two-dimensional map data.

At block S140, based on the relative elevation of each type of three-dimensional map data, the two-dimensional map data and three-dimensional map data to be fused are fused to obtain fused data.

In the embodiment of the present disclosure, after calculating the relative elevation for each type of three-dimensional map data by using the two-dimensional map data as the base surface, the three-dimensional map data and the two-dimensional map data are fused based on the relative elevation.

It can be seen that, in the embodiment of the present disclosure, the two-dimensional map data and three-dimensional map data to be fused are obtained, then the three-dimensional map data is classified into line data, surface data, and traffic body data according to map data types, the preset elevation conversion algorithm is used for each type of three-dimensional map data to obtain its relative elevation, and the three-dimensional map data and the two-dimensional map data are fused based on the relative elevation of each type of three-dimensional map data to obtain the fused data. By applying the embodiment of the disclosure, different elevation conversion algorithms are used to calculate the relative elevation for different types of three-dimensional map data, instead of uniformly converting the elevation based on a certain base surface, which improves the accuracy of the relative elevation calculation, and thereby improves the accuracy of map data fusion. Further, the whole process is fully automated with large-scale replication ability, and without manual participation, which reduces the labor cost and improves the efficiency of data fusion.

Figure 2:
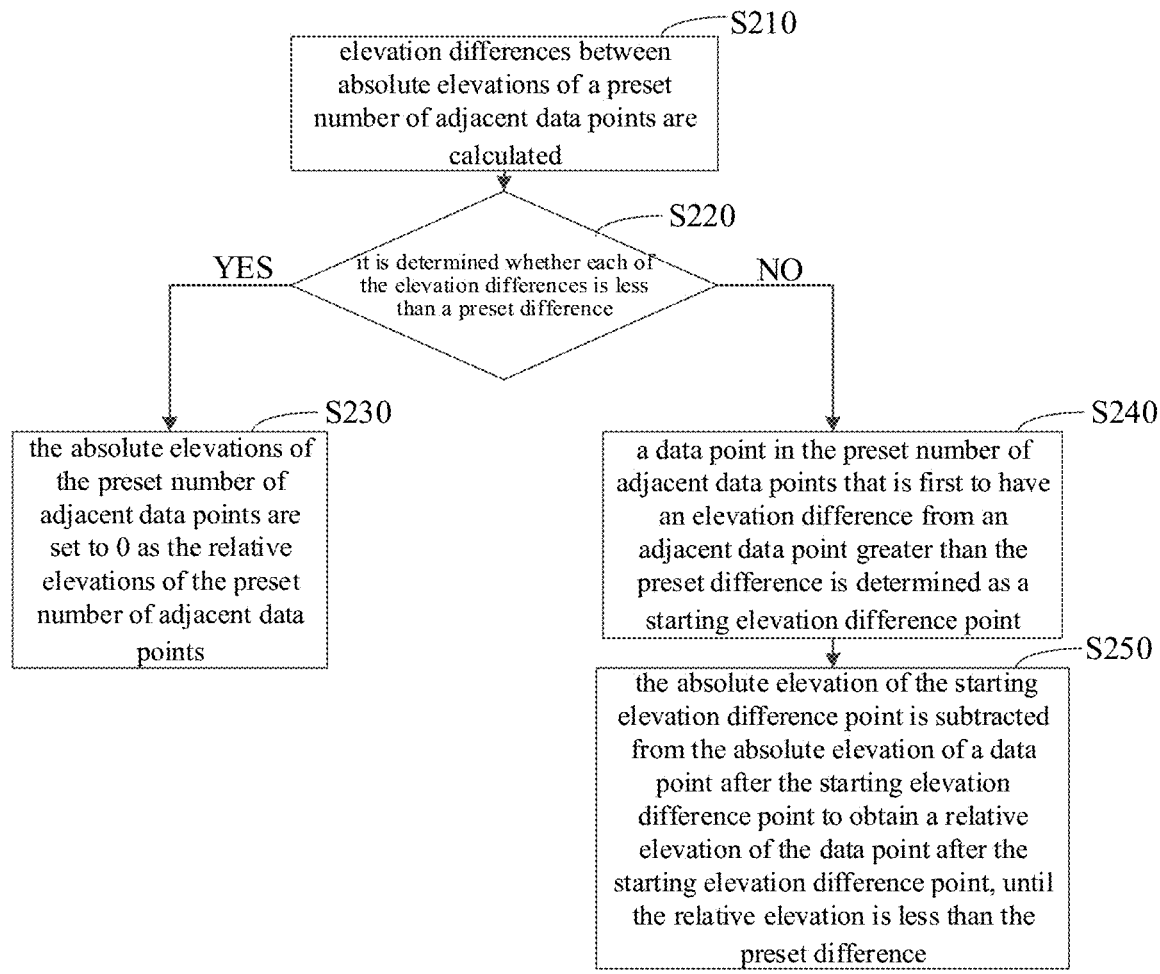
FIG. 2 is a flowchart of an embodiment of an elevation conversion of three-dimensional map data in the present disclosure.

In an embodiment of the present disclosure, for line data and surface data, as illustrated in FIG. 2, a preset elevation conversion algorithm includes the following steps.

At block S210, elevation differences between absolute elevations of a preset number of adjacent data points are calculated.

In the embodiment of the present disclosure, the line data or area data can be traversed, and for each data point of the line data or area data, the absolute elevation differences between 20 adjacent data points are calculated. The specific value of the preset number can be set by relevant personnel according to needs, which is not specified in the present disclosure.

At block S220, it is determined whether each of the elevation differences is less than a preset difference. When each elevation difference is less than the preset difference (Yes), a step at block S230 is performed; when there is an elevation difference among the elevation differences that is greater than the preset difference (No), a step at block S240 is performed.

At block S230, the absolute elevations of the preset number of adjacent data points are set to 0 as the relative elevations of the preset number of adjacent data points.

In the embodiment of the present disclosure, the adjacent data points, between which the elevation differences are less than the preset difference, can be considered as being at a same horizontal plane, thus the absolute elevations of these points can be set to 0 as their relative elevations.

At block S240, a data point in the preset number of adjacent data points that is first to have an elevation difference from an adjacent data point greater than the preset difference is determined as a starting elevation difference point.

At block S250, the absolute elevation of the starting elevation difference point is subtracted from the absolute elevation of a data point after the starting elevation difference point to obtain a relative elevation of the data point after the starting elevation difference point, until the relative elevation is less than the preset difference.

In the embodiment of the present disclosure, when the elevation difference between the adjacent data points is greater than the preset difference, these data points can be considered as not being at a same plane. When the relative elevations of the subsequent data points are calculated based on the absolute elevation of one of the data points that are not in the same plane, the data points may float in the air or under the ground due to the inaccurate calculation of the relative elevation.

Therefore, in order to avoid the above situation, in the embodiment of the present disclosure, the data point in the preset number of adjacent data points that is first to have an elevation difference from an adjacent data point greater than the preset difference can be determined as the starting elevation difference point. The relative elevation of subsequent data points can be determined based on the starting elevation difference point.

When the relative elevation of the data point after the starting elevation difference point is calculated to be less than the preset difference, then for this data point, the relative elevation of the data point can be determined by calculating the elevation differences between the absolute elevations of the preset number of adjacent data points.

For example, for the surface data such as an elevated bridge, since the fluctuation of its own elevation is relatively large, S240-S250 can be used to determine the relative elevation of each point on the surface. In this way, users can see the fluctuation when displaying the fused map.

Specifically, the surface data of the elevated bridge is traversed, the test is started from a first end of the elevated bridge, the absolute elevation differences between 20 adjacent data points are calculated one by one. When the calculated absolute elevation difference between a data point and its previous data point exceeds the preset difference, the data point can be used as the starting elevation difference point. The relative elevation of a data point after the starting elevation difference point can be calculated based on the starting elevation difference point. Specifically, for the data point after the starting elevation difference point, the absolute elevation difference between the data point and the starting elevation difference point can be calculated as the relative elevation of this data point. When the relative elevation of the data point after the starting elevation difference point is calculated to be less than the preset difference, it can be understood that this data point is at the end of the elevated bridge. Therefore, the relative elevation of this data point can be calculated by calculating the absolute elevation differences between 20 adjacent data points.

It can be seen that, in the embodiment of the present disclosure, when performing the elevation conversion for line data and area data, two different calculation modes are used for two different situations, which further improves the accuracy of elevation conversion and thus improves the accuracy of map data fusion.

In an embodiment of the present disclosure, the traffic body data may include road surface body data and air body data. The road surface body data refers to the traffic body data of which the bottom is on the ground, such as a lamp post of a street lamp and a support frame of a sign. The air body data refers to the traffic body data of which the bottom is suspended in the air, such as a lamp part of the street lamp and a sign part of the sign. The road surface body data and air body data belonging to the same traffic body have an association relationship. For example, there is a connection relationship between the lamp post and the lamp of the street lamp.

In a case that the three-dimensional map data includes the traffic body data, before S130, the method further includes a step of obtaining from the road surface body data a first absolute elevation of a centroid point of a road surface body and a second absolute elevation of a bottom of the road surface body, and obtaining from the associated air body data a third absolute elevation of a centroid point of the air body.

As mentioned above, in the embodiment of the present disclosure, the traffic body data is a bounding box containing a centroid coordinate. Therefore, the coordinates of the centroid can be obtained directly from the traffic body data to obtain the absolute elevation of the centroid. The absolute elevation of the bottom of the road surface body can be obtained based on the coordinates of the centroid point and the length, width, and height parameters. As a specific implementation, the centroid point of the road surface body can be located at its center point, so the absolute elevation h0 of the bottom of the road surface body can be the difference between the absolute elevation h1 of its centroid point and half of its height h/2.

In an embodiment of the present disclosure, for the road surface body data, the preset elevation conversion algorithm includes calculating a first elevation difference between the first absolute elevation and the second absolute elevation, as a relative elevation of the road surface body As mentioned above, the bottom of the road surface body data is on the ground, thus in the embodiment of the present disclosure, the relative elevation of the bottom of the road surface body data can be set to 0, that is, in alignment with the base surface. Therefore, the relative elevation of the centroid point of the road surface body data is the difference between the absolute elevation of its centroid point and the absolute elevation of its bottom.

In an embodiment of the present disclosure, for the air body data, the preset elevation conversion algorithm includes the following steps.

In first step, a second elevation difference between the third absolute elevation and the first absolute elevation is calculated. That is, the difference between the absolute elevation of the centroid point of the air body data and the absolute elevation of the centroid point of the associated road surface body data.

In the second step, the relative elevation of the road surface body data associated with the air body data and the second elevation difference are summed as the relative elevation of the air body data.

In the embodiment of the present disclosure, since the air body data is in connection with the associated road surface body data, the calculation of the relative elevation of the air body data can be based on the summing of the relative elevation of the associated road surface body data and the elevation difference between the absolute elevation of the centroid point of the air body data and the absolute elevation of the centroid point of the associated road body data, the sum is used as the relative elevation of the air body data.

In this way, different elevation conversion algorithms are adopted for different types of traffic body data to further improve the accuracy of relative elevation calculation.

Figure 3:
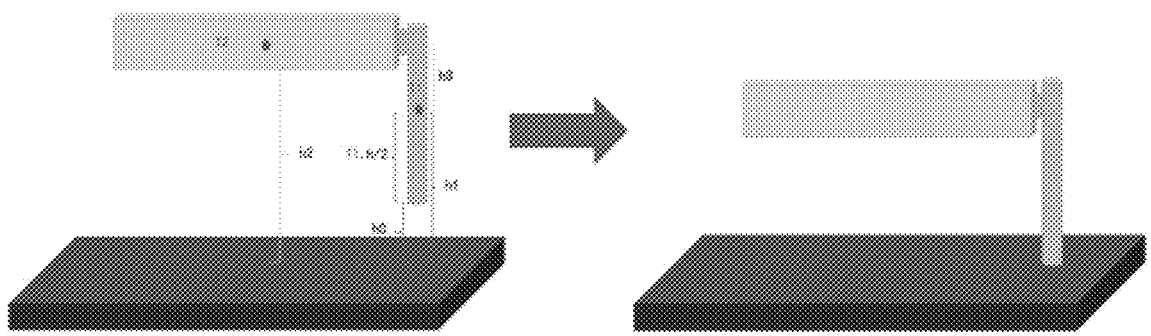
FIG. 3 is a specific implementation of an elevation conversion of three-dimensional map data in the present disclosure.

As illustrated in FIG. 3, which is a specific implementation of an elevation conversion of traffic data in the present disclosure.

For the road surface body data T1, its relative elevation is the absolute elevation h1 of the centroid point of T1 minus the absolute elevation h0 of the bottom of T1. As mentioned above, the centroid point of the road surface body is generally located at its center position, so the relative elevation of the road surface body data T1 is half of its height T1.h, that is, T1.h/2.

For air body data T2, its relative elevation is the absolute elevation h2 of the centroid point of T2 minus the absolute elevation h1 of the centroid point of T1 plus the relative elevation T1.h/2 of T1, that is, h3+T1.h/2.

It can be seen from FIG. 3 that the fusion of the traffic body data based on its relative elevation and two-dimensional road network data can achieve a good result, and the traffic body will not float on the road.

In another embodiment of the present disclosure, the nearest road line coordinate point can also be found according to the centroid point of the traffic body data, and the relative elevation of the traffic body data can be obtained by subtracting two points.

In the embodiment, the nearest line data point can be determined for the centroid point of respective traffic body data, and the difference between the absolute elevation of the centroid point of the traffic body data and the absolute elevation of the line data point can be calculated, the difference plus the relative elevation of the line data point is the relative elevation of the traffic body data.

Figure 4:
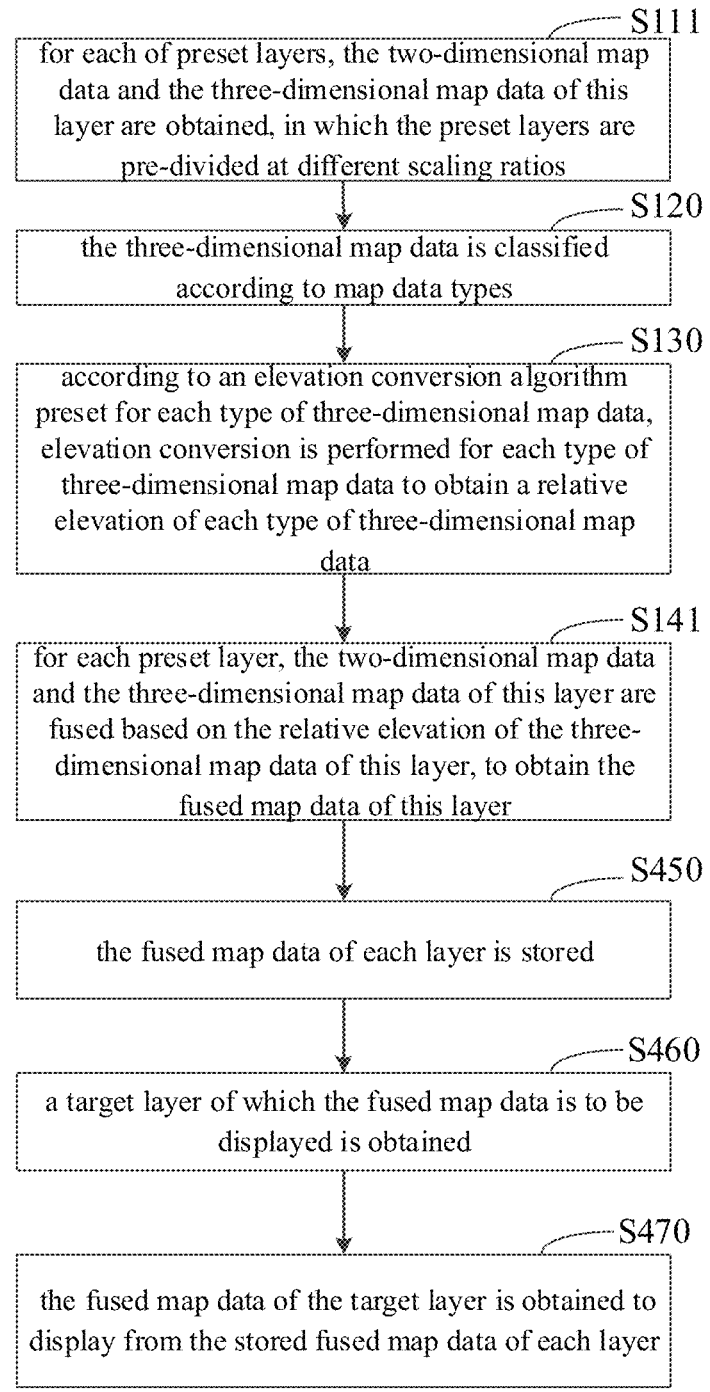
FIG. 4 is a flowchart of a second embodiment of a method for fusing map data provided according to the present disclosure.

In an embodiment of the present disclosure based on FIG. 1, as illustrated in FIG. 4, S110 can include the following step.

At block S111, for each of preset layers, the two-dimensional map data and the three-dimensional map data of this layer are obtained, in which the preset layers are pre-divided at different scaling ratios.

In the embodiment of the present disclosure, a plurality of scaling ratios can be preset, and levels can be set for each scaling ratio. Different levels of two-dimensional map data and three-dimensional map data may contain different information. For example, low level two-dimensional map data and three-dimensional map data may include road network information, and detailed information such as lane lines on roads may be less; high level two-dimensional map data and three-dimensional map data may include more road details.

As illustrated in FIG. 4, S140 shown in FIG. 1 can include the following steps.

At block S141, for each preset layer, the two-dimensional map data and the three-dimensional map data of this layer are fused based on the relative elevation of the three-dimensional map data of this layer, to obtain the fused map data of this layer.

In an embodiment of the present disclosure, as illustrated in FIG. 4, the above method can also include the following step.

At block S450, the fused map data of each layer is stored.

In this way, when displaying the fused map data for a user, the user need can be met and the user experience can be improved.

Correspondingly, in an embodiment of the present disclosure, as illustrated in FIG. 4, the above method can also include the following step.

At block S460, a target layer of which the fused map data is to be displayed is obtained.

In the embodiment of the present disclosure, the above target level can be determined by the user's selection of the scaling ratios. As a specific implementation, in the process of viewing the map, the user can select the desired scaling ratio by controlling the zoom in and zoom out of the page with fingers. In this way, the level corresponding to the scaling ratio can be obtained as the target level, which is not specifically limited in the present disclosure.

At block S470, the fused map data of the target layer is obtained to display from the stored fused map data of each layer.

As illustrated in FIGS. 5a to 5d, the fused map data of different levels in the present disclosure is shown, specifically, the fused map data of two-dimensional road network and three-dimensional road network (lane level high-precision map) is shown.

Figure 5A:
FIGS. 5a, 5b, 5c, and 5d are schematic diagrams of fused map data of different levels in the present disclosure.
Figure 5B:
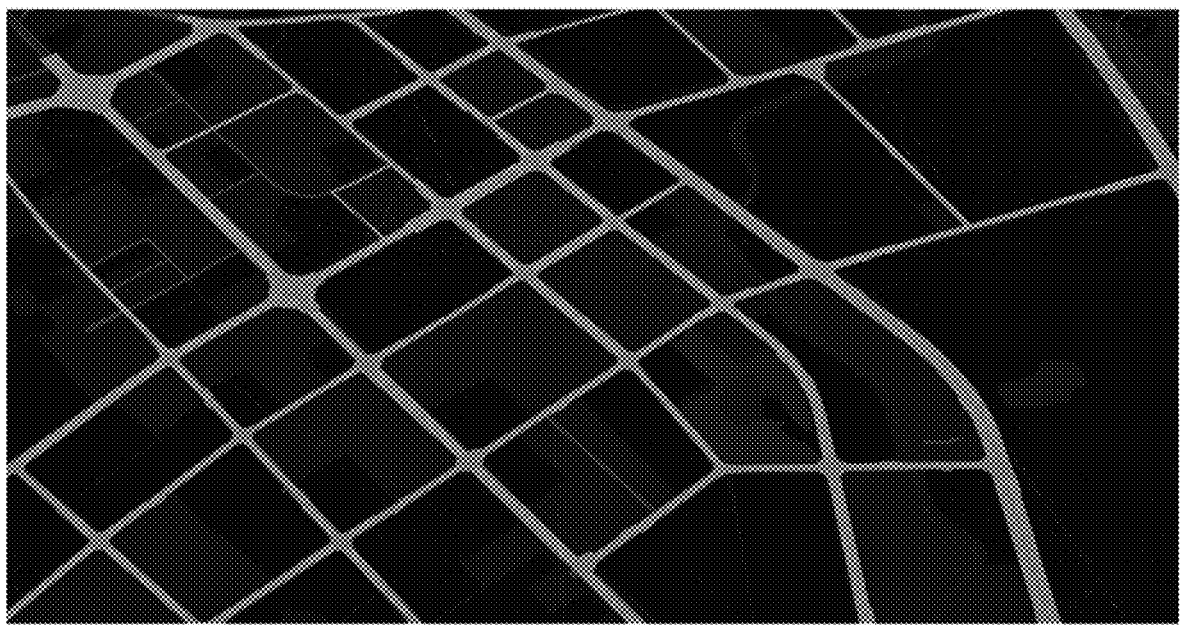
Figure 5C:
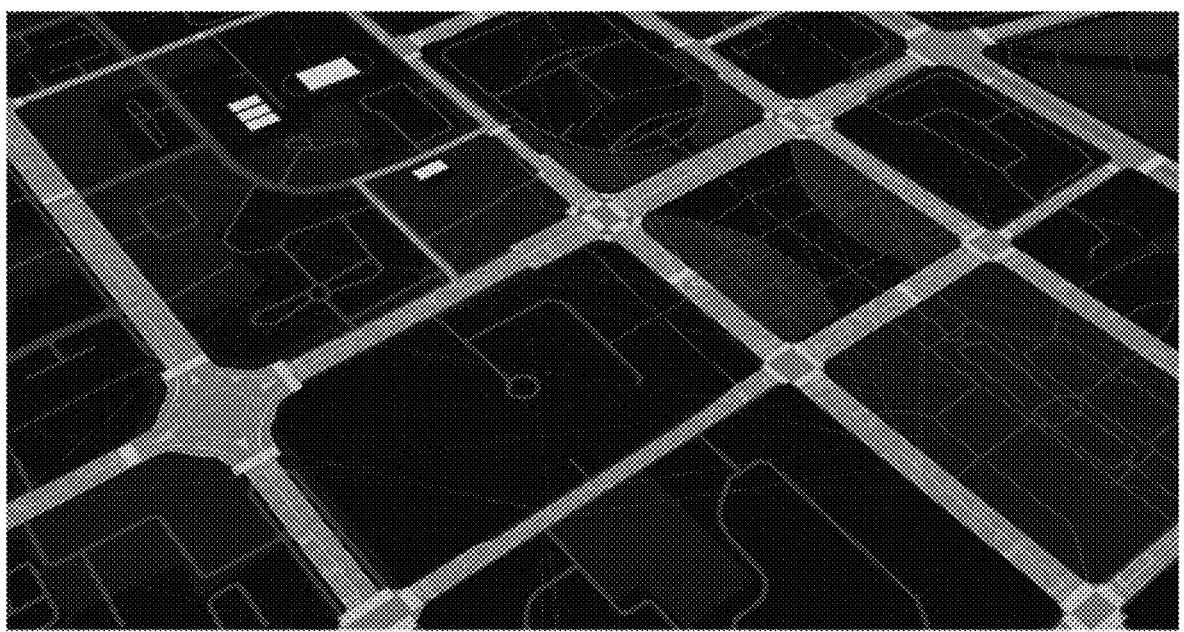
Figure 5D:
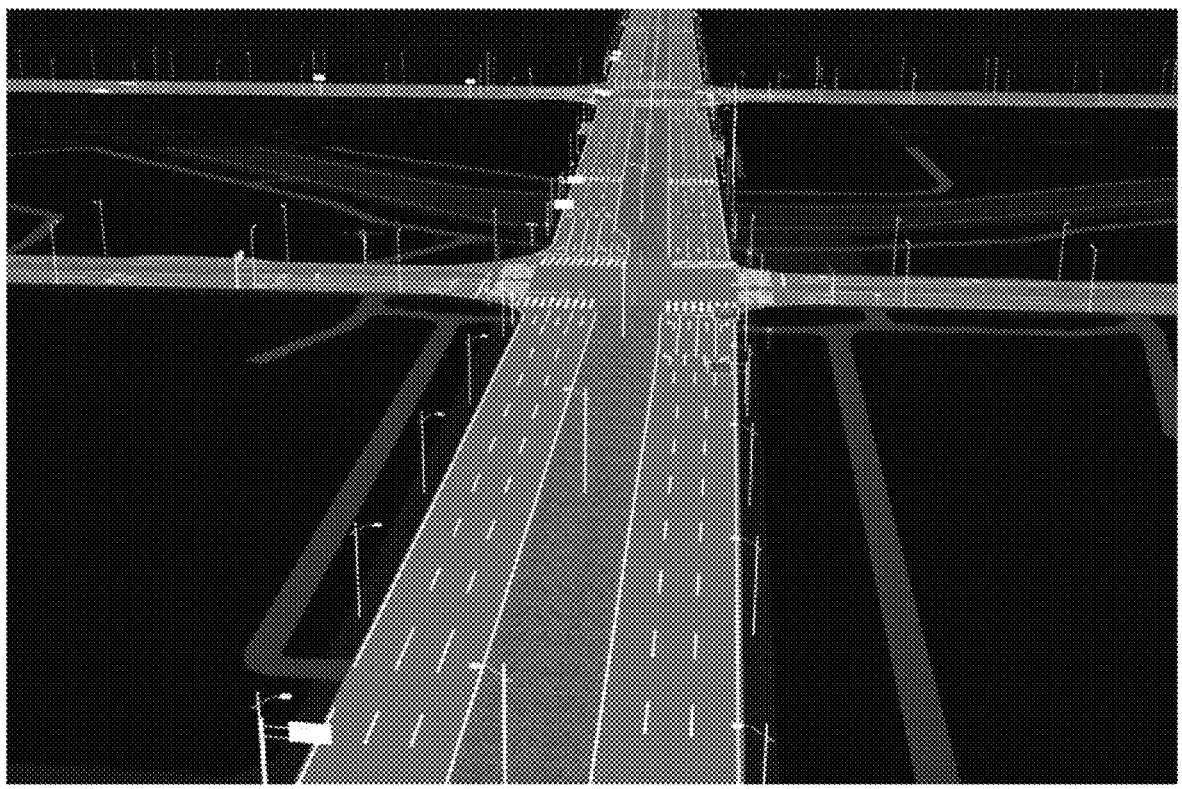

FIGS. 5a and 5b show the fusion of the two-dimensional and three-dimensional road networks at lower levels. FIG. 5a shows the overall situation of the relationship between roads in the road network, there is less detailed information and the three-dimensional effect is not obvious. FIG. 5b is an enlarged map of FIG. 5a. As shown in FIG. 5b, since its level is still low, its three-dimensional effect is not obvious. FIG. 5c is an enlarged map of FIG. 5b. Compared with FIG. 5b, this map is clearer, shows more details on the roads, such as lane lines and road conditions, and shows a bit of three-dimensional effect. FIG. 5d is a result of further enlarging FIG. 5c. As shown in FIG. 5d, the elements of lane level high-precision map (lane line, road surface, green belt, street lamp, etc.) are displayed on the two-dimensional road network. The fusion of lane level high-precision map data and two-dimensional map road network data is realized, and the three-dimensional effect is obvious.

It can be seen that the method for fusing map data provided in the present disclosure can realize the superposed fusion and display of two-dimensional map road network data and the relevant contents of lane level high-precision map data, achieve a seamless alignment of display effect, that is, have a good visibility. Also, the whole process can be fully automated without manual modification of the elevation of the three-dimensional map (such as lane level high-precision map) data, which greatly frees up human resources. In addition, the method for fusing map data provided by the present disclosure has good portability, that is, the method can be transplanted to the fusion rendering business of any lane level high-precision map data and two-dimensional map road network data.

Figure 6:
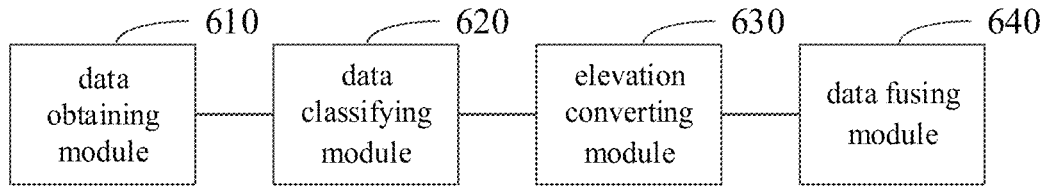
FIG. 6 is a block diagram of a first embodiment of an apparatus for fusing map data provided according to the present disclosure.

According to another aspect of embodiments of the present disclosure, there is provided an apparatus for fusing map data, as illustrated in FIG. 6, the apparatus can include a data obtaining module 610, a data classifying module 620, an elevation converting module 630, and a data fusing module 640.

The data obtaining module 610 is configured to obtain two-dimensional map data and three-dimensional map data to be fused;

The data classifying module 620 is configured to classify the three-dimensional map data according to map data types, the map data types including line data, surface data, and traffic body data;

The elevation converting module 630 is configured to perform elevation conversion for each type of three-dimensional map data according to an elevation conversion algorithm preset for each type of three-dimensional map data, to obtain a relative elevation of each type of three-dimensional map data; and The data fusing module 640 is configured to fuse the two-dimensional map data and the three-dimensional map data to be fused based on the relative elevation of each type of three-dimensional map data to obtain fused data.

It can be seen that, in the embodiment of the present disclosure, the two-dimensional map data and three-dimensional map data to be fused are obtained, then the three-dimensional map data is classified into line data, surface data, and traffic body data according to map data types, the preset elevation conversion algorithm is used for each type of three-dimensional map data to obtain its relative elevation, and the three-dimensional map data and the two-dimensional map data are fused based on the relative elevation of each type of three-dimensional map data to obtain the fused data. By applying the embodiment of the disclosure, different elevation conversion algorithms are used to calculate the relative elevation for different types of three-dimensional map data, instead of uniformly converting the elevation based on a certain base surface, which improves the accuracy of the relative elevation calculation, and thereby improves the accuracy of map data fusion. Further, the whole process is fully automated with large-scale replication ability, and without manual participation, which reduces the labor cost and improves the efficiency of data fusion.

In an embodiment of the present disclosure, the line data is a line consisting of a continuous coordinate series, the surface data is an area consisting of a continuous and closed coordinate series, and the traffic body data is a bounding box containing a centroid coordinate.

In an embodiment of the present disclosure, for the line data and/or surface data, the preset elevation conversion algorithm includes: calculating elevation differences between absolute elevations of a preset number of adjacent data points; when each of the elevation differences is less than a preset difference, setting the absolute elevations of the preset number of adjacent data points to 0 as the relative elevations of the preset number of adjacent data points; when there is an elevation difference among the elevation differences that is greater than the preset difference, determining in the preset number of adjacent data points, a data point that is first to have an elevation difference from an adjacent data point greater than the preset difference, as a starting elevation difference point; and subtracting the absolute elevation of the starting elevation difference point from the absolute elevation of a data point after the starting elevation difference point to obtain a relative elevation of the data point after the starting elevation difference point, until the relative elevation is less than the preset difference.

In an embodiment of the present disclosure, the traffic body data includes road surface body data and air body data, the road surface body data and the air body data belonging to a same traffic body have an association relationship.

Figure 7:
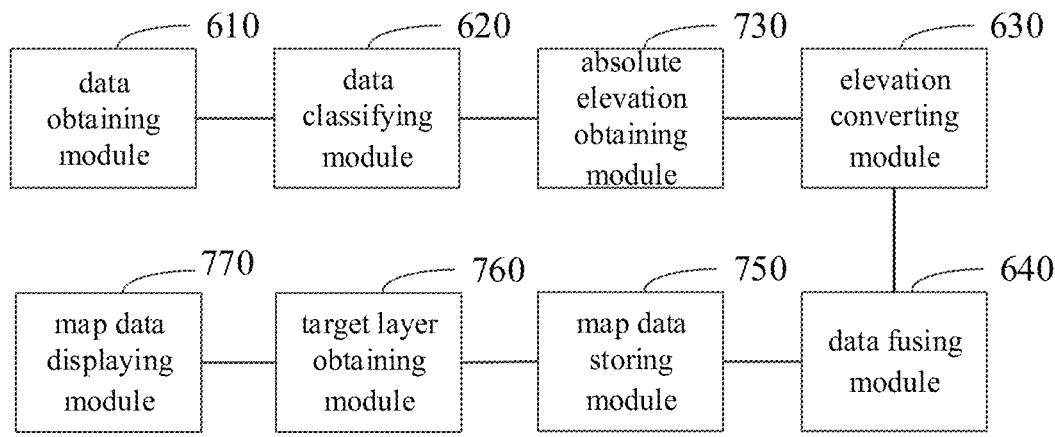
FIG. 7 is a block diagram of a second embodiment of an apparatus for fusing map data provided according to the present disclosure.

Based on FIG. 6, as illustrated in FIG. 7, the apparatus further includes an absolute elevation obtaining module 730. The absolute elevation obtaining module 730 is configured to obtain from the road surface body data a first absolute elevation of a centroid point of a road surface body and a second absolute elevation of a bottom of the road surface body, and obtain from the associated air body data a third absolute elevation of a centroid point of the air body.

For the road surface body data, the preset elevation conversion algorithm includes calculating a first elevation difference between the first absolute elevation and the second absolute elevation, as a relative elevation of the road surface body.

For the air body data, the preset elevation conversion algorithm includes calculating a second elevation difference between the third absolute elevation and the first absolute elevation, and summing the relative elevation of the road surface body data associated with the air body data and the second elevation difference, as the relative elevation of the air body data.

In an embodiment of the present disclosure, the data obtaining module 610 is configured to obtain, for each of preset layers, the two-dimensional map data and the three-dimensional map data of this layer, in which the preset layers are pre-divided at different scaling ratios.

The data fusing module 640 is configured to fuse, for each preset layer, the two-dimensional map data and the three-dimensional map data of this layer based on the relative elevation of the three-dimensional map data of this layer, to obtain the fused map data of this layer.

As illustrated in FIG. 7, the apparatus can further include a map data storing module 750 configured to store the fused map data of each layer.

In an embodiment of the present disclosure, based on FIG. 6, as illustrated in FIG. 7, the above apparatus can further include a target layer obtaining module 760 and a map data displaying module 770.

The target layer obtaining module 760 is configured to obtain a target layer of which the fused map data is to be displayed.

The map data displaying module 770 is configured to obtain from the stored fused map data of each layer the fused map data of the target layer to display.

In the technical scheme of the present disclosure, the collection, storage, use, processing, transmission, provision and publication of the personal information of the users involved are carried out with the consent of the users, and are in conformity with relevant laws and regulations, and are not in violation of public order and good customs.

According to embodiments of the present disclosure, the present disclosure also provides an electronic device, a readable storage medium and a computer program product.

Figure 8:
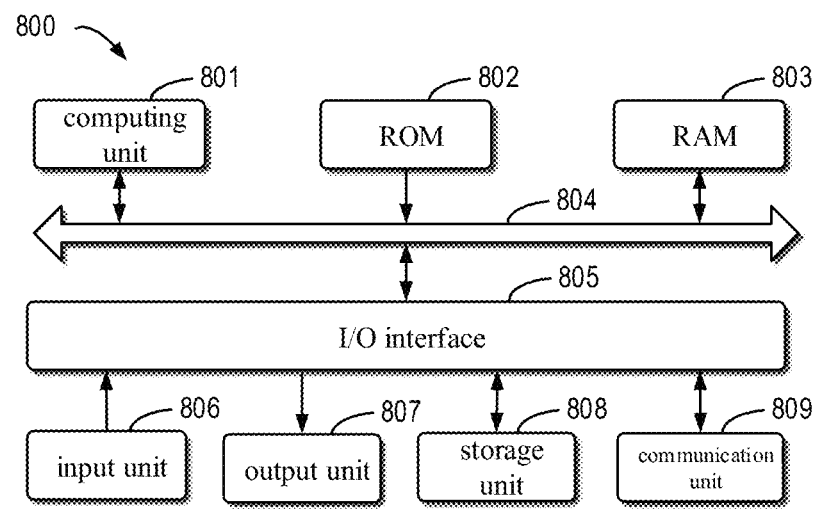
FIG. 8 is a block diagram of an electronic device configured to implement a method for fusing map data according to embodiments of the present disclosure.

FIG. 8 is a block diagram of an example electronic device 800 used to implement embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the present disclosure described and/or required herein.

As illustrated in FIG. 8, the device 800 includes a computing unit 801 performing various appropriate actions and processes based on computer programs stored in a read-only memory (ROM) 802 or computer programs loaded from the storage unit 808 to a random access memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an input unit 806, such as a keyboard, a mouse; an output unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 801 executes the various methods and processes described above, such as the method for fusing road data to generate a map. For example, in some embodiments, the method for fusing road data to generate a map may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method described above may be executed. Alternatively, in other embodiments, the computing unit 801 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or their combination. These various implementations may be realized in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or includes such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, a server of distributed system or a server combined with block-chain.

It should be understood that the various forms of processes shown above can be used to reorder, add or delete steps. For example, the steps described in the present disclosure could be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for fusing map data, comprising:
obtaining two-dimensional map data and three-dimensional map data to be fused, wherein a coordinate expression of the two-dimensional map data is (x, y), a coordinate expression of the three-dimensional map data is (x, y, z), x and y are longitude and latitude information, and z is absolute elevation information;
classifying the three-dimensional map data according to map data types, the map data types comprising line data, surface data, and traffic body data;
performing elevation conversion for each type of three-dimensional map data according to an elevation conversion algorithm preset for each type of three-dimensional map data, to obtain a relative elevation of each type of three-dimensional map data; and
fusing the two-dimensional map data and three-dimensional map data to be fused based on the relative elevation of each type of three-dimensional map data, to obtain fused data, to realize a presentation of the three-dimensional map data on two-dimensional map data.

2. The method according to claim 1, wherein,
the line data is a line consisting of a continuous coordinate series;
the surface data is an area consisting of a continuous and closed coordinate series; and
the traffic body data is a bounding box containing a centroid coordinate.

3. The method according to claim 1, wherein for the line data and/or surface data, the preset elevation conversion algorithm comprises:
calculating elevation differences between absolute elevations of a preset number of adjacent data points;
when each of the elevation differences is less than a preset difference, setting the absolute elevations of the preset number of adjacent data points to 0 as the relative elevations of the preset number of adjacent data points;
when there is an elevation difference among the elevation differences that is greater than the preset difference, determining in the preset number of adjacent data points, a data point that is first to have an elevation difference from an adjacent data point greater than the preset difference, as a starting elevation difference point; and
subtracting the absolute elevation of the starting elevation difference point from the absolute elevation of a data point after the starting elevation difference point to obtain a relative elevation of the data point after the starting elevation difference point, until the relative elevation is less than the preset difference.

4. The method according to claim 2, wherein,
the traffic body data comprises road surface body data and air body data, the road surface body data and the air body data belonging to a same traffic body have an association relationship;
before performing elevation conversion on each type of three-dimensional map data according to an elevation conversion algorithm preset for each type of three-dimensional map data to obtain a relative elevation of each type of three-dimensional map data, the method further comprises: obtaining from the road surface body data a first absolute elevation of a centroid point of a road surface body and a second absolute elevation of a bottom of the road surface body, and obtaining from the associated air body data a third absolute elevation of a centroid point of the air body;
for the road surface body data, the preset elevation conversion algorithm comprises calculating a first elevation difference between the first absolute elevation and the second absolute elevation, as a relative elevation of the road surface body; and
for the air body data, the preset elevation conversion algorithm comprises calculating a second elevation difference between the third absolute elevation and the first absolute elevation, and summing the relative elevation of the road surface body data associated with the air body data and the second elevation difference, as the relative elevation of the air body data.

5. The method according to claim 1, wherein,
obtaining the two-dimensional map data and three-dimensional map data to be fused comprises:
obtaining, for each of preset layers, the two-dimensional map data and the three-dimensional map data of the layer, wherein the preset layers are pre-divided at different scaling ratios,
fusing the two-dimensional map data and three-dimensional map data to be fused based on the relative elevation of each type of three-dimensional map data to obtain the fused data comprises:
fusing, for each preset layer, the two-dimensional map data and the three-dimensional map data of the layer based on the relative elevation of the three-dimensional map data of the layer, to obtain the fused map data of the layer,
the method further comprises:
storing the fused map data of each layer.

6. The method according to claim 5, further comprising:
obtaining a target layer of which the fused map data is to be displayed; and
obtaining, from the stored fused map data of each layer, the fused map data of the target layer to display.

7. An electronic device, comprising:
at least one processor; and
a memory communicatively coupled to the at least one processor; wherein,
the at least one processor is configured to:
obtain two-dimensional map data and three-dimensional map data to be fused, wherein a coordinate expression of the two-dimensional map data is (x, y), a coordinate expression of the three-dimensional map data is (x, y, z) x and y are longitude and latitude information, and z is absolute elevation information;

classify the three-dimensional map data according to map data types, the map data types comprising line data, surface data, and traffic body data;

perform elevation conversion for each type of three-dimensional map data according to an elevation conversion algorithm preset for each type of three-dimensional map data, to obtain a relative elevation of each type of three-dimensional map data; and fuse the two-dimensional map data and three-dimensional map data to be fused based on the relative elevation of each type of three-dimensional map data, to obtain fused data, to realize a presentation of the three-dimensional map data on two-dimensional map data.

8. The electronic device according to claim 7, wherein, the line data is a line consisting of a continuous coordinate series;

the surface data is an area consisting of a continuous and closed coordinate series; and the traffic body data is a bounding box containing a centroid coordinate.

9. The electronic device according to claim 7, wherein for the line data and/or surface data, the preset elevation conversion algorithm comprises:

calculating elevation differences between absolute elevations of a preset number of adjacent data points;

when each of the elevation differences is less than a preset difference, setting the absolute elevations of the preset number of adjacent data points to 0 as the relative elevations of the preset number of adjacent data points;

when there is an elevation difference among the elevation differences that is greater than the preset difference, determining in the preset number of adjacent data points, a data point that is first to have an elevation difference from an adjacent data point greater than the preset difference, as a starting elevation difference point; and subtracting the absolute elevation of the starting elevation difference point from the absolute elevation of a data point after the starting elevation difference point to obtain a relative elevation of the data point after the starting elevation difference point, until the relative elevation is less than the preset difference.

10. The electronic device according to claim 8, wherein, the traffic body data comprises road surface body data and air body data, the road surface body data and the air body data belonging to a same traffic body have an association relationship;

before performing elevation conversion on each type of three-dimensional map data according to an elevation conversion algorithm preset for each type of three-dimensional map data to obtain a relative elevation of each type of three-dimensional map data, the at least one processor is further configured to: obtain from the road surface body data a first absolute elevation of a centroid point of a road surface body and a second absolute elevation of a bottom of the road surface body, and obtain from the associated air body data a third absolute elevation of a centroid point of the air body;

for the road surface body data, the preset elevation conversion algorithm comprises calculating a first elevation difference between the first absolute elevation and the second absolute elevation, as a relative elevation of the road surface body; and for the air body data, the preset elevation conversion algorithm comprises calculating a second elevation difference between the third absolute elevation and the first absolute elevation, and summing the relative elevation of the road surface body data associated with the air body data and the second elevation difference, as the relative elevation of the air body data.

11. The electronic device according to claim 7, wherein the at least one processor, when obtaining the two-dimensional map data and three-dimensional map data to be fused, is further configured to:

obtain, for each of preset layers, the two-dimensional map data and the three-dimensional map data of the layer, wherein the preset layers are pre-divided at different scaling ratios, the at least one processor, when fusing the two-dimensional map data and three-dimensional map data to be fused based on the relative elevation of each type of three-dimensional map data to obtain the fused data, is further configured to:

fuse, for each preset layer, the two-dimensional map data and the three-dimensional map data of the layer based on the relative elevation of the three-dimensional map data of the layer, to obtain the fused map data of the layer, the at least one processor is further configured to:

store the fused map data of each layer.

12. The electronic device according to claim 11, the at least one processor is further configured to:

obtain a target layer of which the fused map data is to be displayed; and obtain, from the stored fused map data of each layer, the fused map data of the target layer to display.

13. A non-transitory computer-readable storage medium having computer instructions stored thereon, wherein the computer instructions are configured to cause a computer to implement a method for fusing map data, comprising:

obtaining two-dimensional map data and three-dimensional map data to be fused, wherein a coordinate expression of the two-dimensional map data is (x, y), a coordinate expression of the three-dimensional map data is (x, y, z), x and y are longitude and latitude information, and z is absolute elevation information;

classifying the three-dimensional map data according to map data types, the map data types comprising line data, surface data, and traffic body data;

performing elevation conversion for each type of three-dimensional map data according to an elevation conversion algorithm preset for each type of three-dimensional map data, to obtain a relative elevation of each type of three-dimensional map data; and fusing the two-dimensional map data and three-dimensional map data to be fused based on the relative elevation of each type of three-dimensional map data, to obtain fused data, to realize a presentation of the three-dimensional map data on two-dimensional map data.

14. The storage medium according to claim 13, wherein, the line data is a line consisting of a continuous coordinate series;

the surface data is an area consisting of a continuous and closed coordinate series; and the traffic body data is a bounding box containing a centroid coordinate.

15. The storage medium according to claim 13, wherein for the line data and/or surface data, the preset elevation conversion algorithm comprises:

calculating elevation differences between absolute elevations of a preset number of adjacent data points;

when each of the elevation differences is less than a preset difference, setting the absolute elevations of the preset number of adjacent data points to 0 as the relative elevations of the preset number of adjacent data points;

when there is an elevation difference among the elevation differences that is greater than the preset difference, determining in the preset number of adjacent data points, a data point that is first to have an elevation difference from an adjacent data point greater than the preset difference, as a starting elevation difference point; and subtracting the absolute elevation of the starting elevation difference point from the absolute elevation of a data point after the starting elevation difference point to obtain a relative elevation of the data point after the starting elevation difference point, until the relative elevation is less than the preset difference.

16. The storage medium according to claim 14, wherein, the traffic body data comprises road surface body data and air body data, the road surface body data and the air body data belonging to a same traffic body have an association relationship;

before performing elevation conversion on each type of three-dimensional map data according to an elevation conversion algorithm preset for each type of three-dimensional map data to obtain a relative elevation of each type of three-dimensional map data, the method further comprises: obtaining from the road surface body data a first absolute elevation of a centroid point of a road surface body and a second absolute elevation of a bottom of the road surface body, and obtaining from the associated air body data a third absolute elevation of a centroid point of the air body;

for the road surface body data, the preset elevation conversion algorithm comprises calculating a first elevation difference between the first absolute elevation and the second absolute elevation, as a relative elevation of the road surface body; and for the air body data, the preset elevation conversion algorithm comprises calculating a second elevation difference between the third absolute elevation and the first absolute elevation, and summing the relative elevation of the road surface body data associated with the air body data and the second elevation difference, as the relative elevation of the air body data.

17. The storage medium according to claim 13, wherein, obtaining the two-dimensional map data and three-dimensional map data to be fused comprises:

obtaining, for each of preset layers, the two-dimensional map data and the three-dimensional map data of the layer, wherein the preset layers are pre-divided at different scaling ratios, fusing the two-dimensional map data and three-dimensional map data to be fused based on the relative elevation of each type of three-dimensional map data to obtain the fused data comprises:

fusing, for each preset layer, the two-dimensional map data and the three-dimensional map data of the layer based on the relative elevation of the three-dimensional map data of the layer, to obtain the fused map data of the layer, the method further comprises:

storing the fused map data of each layer.

18. The storage medium according to claim 17, wherein the method further comprises:

obtaining a target layer of which the fused map data is to be displayed; and obtaining, from the stored fused map data of each layer, the fused map data of the target layer to display.

\* \* \* \* \*